US 8,115,939 B2

(12) United States Patent
Yamada

(10) Patent No.: US 8,115,939 B2
(45) Date of Patent: Feb. 14, 2012

(54) IMAGE PROCESSING APPARATUS, IMAGE PROCESSING METHOD AND STORAGE MEDIUM STORING IMAGE PROCESSING

(75) Inventor: Kenji Yamada, Ebina (JP)

(73) Assignee: Fuji Xerox Co. Ltd., Tokyo (JP)

( * ) Notice: Subject to any disclaimer, the term of this patent is extended or adjusted under 35 U.S.C. 154(b) by 999 days.

(21) Appl. No.: 11/389,828

(22) Filed: Mar. 27, 2006

(65) Prior Publication Data

US 2007/0091341 A1   Apr. 26, 2007

(30) Foreign Application Priority Data

Oct. 24, 2005   (JP) ................................. 2005-308032

(51) Int. Cl.
*G06F 15/00* (2006.01)
*G06F 15/16* (2006.01)

(52) U.S. Cl. ........................................ 358/1.13; 709/203

(58) Field of Classification Search .................. 358/1.15, 358/1.13, 1.14, 1.16, 1.18, 403, 474, 468, 358/450; 382/305, 154, 115; 715/471, 762, 715/702, 771; 345/173, 573, 682, 89
See application file for complete search history.

(56) References Cited

U.S. PATENT DOCUMENTS

| | | | | |
|---|---|---|---|---|
| 5,844,542 A * | 12/1998 | Inoue et al. | ................. | 345/594 |
| 6,750,890 B1 * | 6/2004 | Sugimoto | ................. | 715/838 |
| 6,795,585 B1 * | 9/2004 | Parada et al. | ................. | 382/254 |
| 6,829,395 B2 * | 12/2004 | Alm | ................. | 382/305 |
| 6,947,593 B2 * | 9/2005 | Jia et al. | ................. | 382/167 |
| 7,023,448 B1 * | 4/2006 | Danciu | ................. | 345/589 |
| 7,027,181 B2 * | 4/2006 | Takamori | ................. | 358/1.6 |
| 7,042,583 B1 * | 5/2006 | Wilkins et al. | ................. | 358/1.15 |
| 7,296,238 B1 * | 11/2007 | Zurawski | ................. | 715/763 |
| 7,542,618 B2 * | 6/2009 | Kang et al. | ................. | 382/254 |
| 7,545,996 B2 * | 6/2009 | Cazier et al. | ................. | 382/276 |
| 2002/0036780 A1 * | 3/2002 | Nakamura | ................. | 358/1.2 |
| 2002/0082484 A1 | 6/2002 | Baba et al. | | |
| 2006/0187479 A1 * | 8/2006 | Kikuchi | ................. | 358/1.13 |
| 2007/0080973 A1 * | 4/2007 | Stauder et al. | ................. | 345/589 |

FOREIGN PATENT DOCUMENTS

| | | | |
|---|---|---|---|
| JP | 11045334 A * | 2/1999 | |
| JP | 2001034775 | 2/2001 | |
| JP | 2002200066 | 7/2002 | |
| JP | 2005122659 | 5/2005 | |
| JP | 2005142745 | 6/2005 | |

OTHER PUBLICATIONS

JP Notice of Grounds of Rejection mailed Aug. 17, 2010 in connection with Japanese Application No. 2005-308032 and English translation thereof.

* cited by examiner

*Primary Examiner* — Saeid Ebrahimi Dehkordy
(74) *Attorney, Agent, or Firm* — Gesmer Updegrove LLP

(57) ABSTRACT

An image processing apparatus has a processing condition setting section, a reference image processing section and a processing condition registration section. The processing condition setting section sets an image processing condition to input image data. The input image data is subjected to image processing according to the image processing condition. The reference image processing section performs the image processing on reference image data according to the image processing condition and generates processed reference image data. The processing condition registration section registers into a condition storage the processed reference image data with the image processing condition.

11 Claims, 5 Drawing Sheets

IMAGE PROCESSING APPARATUS, IMAGE PROCESSING METHOD AND STORAGE MEDIUM STORING IMAGE PROCESSING

PRIORITY INFORMATION

This application claims priority to Japanese Patent Application No. 2005-308032, filed on Oct. 24, 2005, which is incorporated herein by reference in its entirety.

BACKGROUND

1. Technical Field

The present invention relates to user interface technology for operating an image processing apparatus, such as a copier, multifunction device, printer, and scanner.

2. Related Art

An image processing apparatus that includes a function called "command history" has been provided in the prior art. The command history function stores a combination of image processing related conditions that a user has input through a user interface section and the corresponding data of an output image to which the combination of conditions is applied, then subsequently allow the same combination of conditions to be reused. When reusing the command history, each stored output image is displayed on a user interface screen of the image processing apparatus. The user views the output images to judge whether or not the combination of conditions applied to the images is desirable and selects a desirable combination of conditions if found. The command history function eliminates the setting of each condition to lighten the task burden on the user.

In the conventional command history function, the image processed result for the original image that was input by the user is used as a reference image. For this reason, the quality of the reference image depends not only on the image processing but also on the quality of the original image itself. Therefore, a problem in the conventional apparatus was that the effect of the image processing could not be accurately determined simply from the corresponding reference image.

SUMMARY

An image processing apparatus has a processing condition setting section, a reference image processing section and a processing condition registration section. The processing condition setting section sets an image processing condition to input image data. The input image data is subjected to image processing according to the image processing condition. The reference image processing section performs the image processing on reference image data according to the image processing condition and generates processed reference image data. The processing condition registration section registers into a condition storage the processed reference image data with the image processing condition.

BRIEF DESCRIPTION OF THE DRAWINGS

These and other aspects of the disclosure will become apparent from the following description read in conjunction with the accompanying drawings wherein the same reference numbers have been applied to like parts and in which.

DETAILED DESCRIPTION

Figure 1:
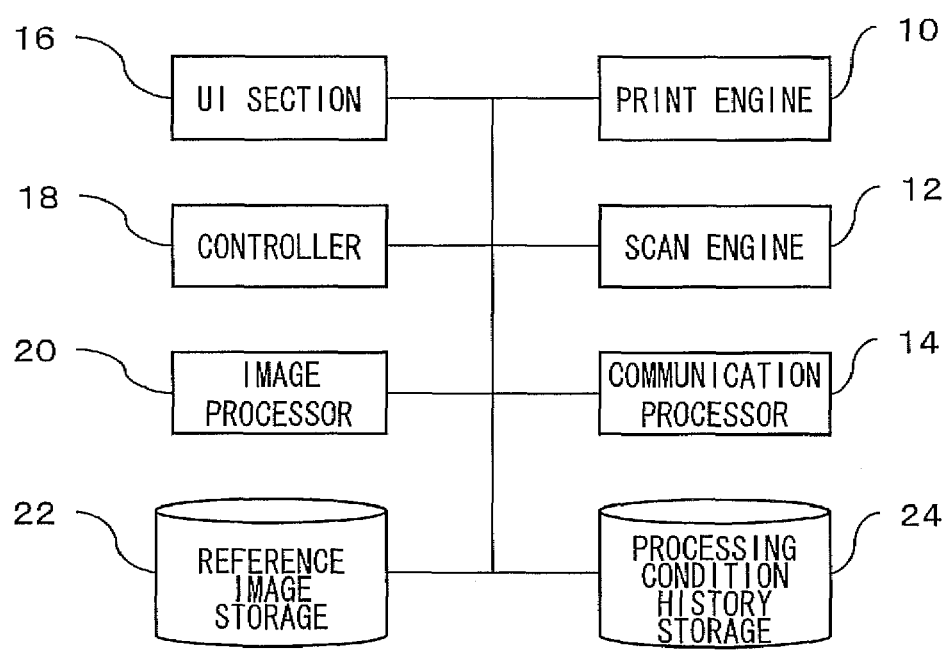
FIG. 1 shows a configuration of an image processing apparatus of an exemplary embodiment of the present invention.

FIG. 1 is a functional block diagram showing an image processing apparatus relating to an exemplary embodiment of the present invention. The image processing apparatus illustrated here combines the functions of a printer, scanner, copier, and facsimile machine, namely, a digital multifunction device.

In the configuration shown in FIG. 1, a print engine 10 prints image data onto a printable medium, such as paper, and a scan engine 12 optically scans an image that has been recorded on a medium, such as paper. A communication processor 14 performs communication processing with a host computer via a data communication path, such as a LAN (local area network). The image processing apparatus can scan an image with the scan engine 12, then provide the obtained image data to the host computer via the communication processor 14, or can receive print data sent from the host computer at the communication processor 14, then print it with the print engine 10. Furthermore, the image processing apparatus can also copy an original by scanning the image of the original with the scan engine 12 and printing it with the print engine 10. A UI (user interface) section 16 is a mechanism for providing a user interface for operating the image processing apparatus and has a display screen, such as a liquid crystal touch panel, and an input device, such as a keyboard and start button. A controller 18 is a control mechanism for controlling units 10 to 24 forming the image processing apparatus.

An image processor 20 is a mechanism for performing image processing on an image scanned by the scan engine 12 or an image printed by the print engine 10. The image processing performed by the image processor 20 includes image processing for attaining a suitable image quality according to processing mode, such as scanning, printing, copying, and facsimile transmission. Also included is image processing suitable for the type of original image, such as text, photographic, or text/photographic (original image combining text and photographs). Furthermore, image processing can also be considered in accordance with the base color of the paper, such as of a newspaper or magazine. Moreover, image processing is also included for adjusting such image quality parameters as optical density, sharpness, and contrast. For the image processing of continuous tone images, tone correction using a tone reproduction curve is well known. For the image processing of scanned images, background removal for removing the density component of the background of an original image (portions the image is not printed) is known. Thus, the image processing to be performed on an original image may include one or a combination of image processing types. The image processor 20 is a hardware circuit or a combination of software and a processor or a digital signal processor (or a combination of these) for performing various types of image processing.

The image processing to be performed by the image processor 20 is determined, for example, on the basis of a combination of user-selected processing mode and image quality parameters. Furthermore, as in the image processing suitable for text originals or photographic originals, there are instances where the image processing, in part or in whole, is determined from the result of analyzing the original image. A condition for determining the content of the image processing to be performed on the original image will be referred to as an "image processing condition". The image processing condition is a combination of individual conditions, such as processing mode, various values of image quality parameter, a result of image analysis, and so forth.

The image processing itself that the image processor 20 performs is a publicly known technology. The image processing apparatus can also perform image processing besides the examples given hereinabove. Furthermore, it is not necessary to perform the entire image processing illustrated hereinabove.

The image processing apparatus of this embodiment includes a function to store and reuse an image processing condition that was used by a past user. A processing condition history storage 24 stores such image processing conditions that were used in the past. In the "command history" function of the prior art, an image processing condition was stored together with the original image data processed according to the image processing condition. In comparison, in the embodiment, an image processing identical to the image processing for the original image is performed on reference image data prepared in advance and the processed reference image is stored as history together with the image processing condition. A reference image storage 22 stores the reference image data.

It is important to use reference image data that clearly shows the effect of the image processing. Since the objects in an image can include text, line drawings, graphics, and photographs, it is preferable for the reference image data to include objects of various image types.

Figure 2:
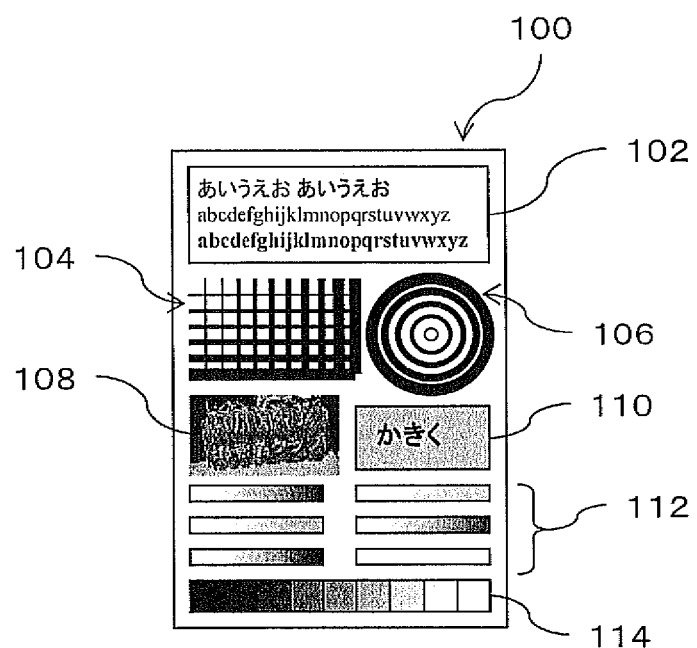
FIG. 2 shows an example of a reference image.

FIG. 2 schematically shows an example of a reference image 100. The reference image 100 includes a text object 102, a line grid object 104, a concentric circle object 106, a photographic object 108, a text on background object 110, a color tone pattern object 112, and a gray tone pattern object 114. The line grid object 104 is arranged with multiple horizontal and vertical lines of differing widths and is used to check the line width reproduction, edge sharpness, contrast, and so forth. The concentric circle object 106 is arranged with multiple concentric circles of differing line widths and can be used to check the curved line width reproduction, stability, edge sharpness, and so forth. The photographic object 108 is a color photographic image, for example, and is used to check the tone reproduction in a continuous tone image. The text on background 110 has text arranged on a background having a certain optical density. It is used to test how the text on an original having a certain degree of density in the background, such as a newspaper, for example, can be viewed after image processing. The color tone pattern object 112 is arranged with continuous tone patterns of the various colors required in a printed or scanned image, such as cyan, magenta, yellow, red, green, and blue, and is used to confirm tone reproduction. The gray tone pattern object 114 is arranged with patches having differing densities of black and is used to confirm black and white tone reproduction.

The reference image 100 illustrated in FIG. 2 is an example. It is not necessary for the reference image to include all the objects illustrated hereinabove and an object not illustrated may be included. For example, by including an object having multiple patterns of differing degrees of edge sharpness in the reference image 100, the user may be able to ascertain the change in sharpness after image processing. Furthermore, if a dot image obtained by expressing the same image in a multiple of differing screen rulings is included in the reference image 100, the influence of the image processing condition with respect to the respective screen ruling can be distinguished.

Furthermore, the reference image may be divided into multiple pages. Moreover, multiple reference images may be prepared to allow a user to select one to be used. For example, a reference image can be prepared for each application according to the processing mode or type of image, such as for copying, for scanning, for text, for photographs, and so forth, from which the user can select.

Figure 3:
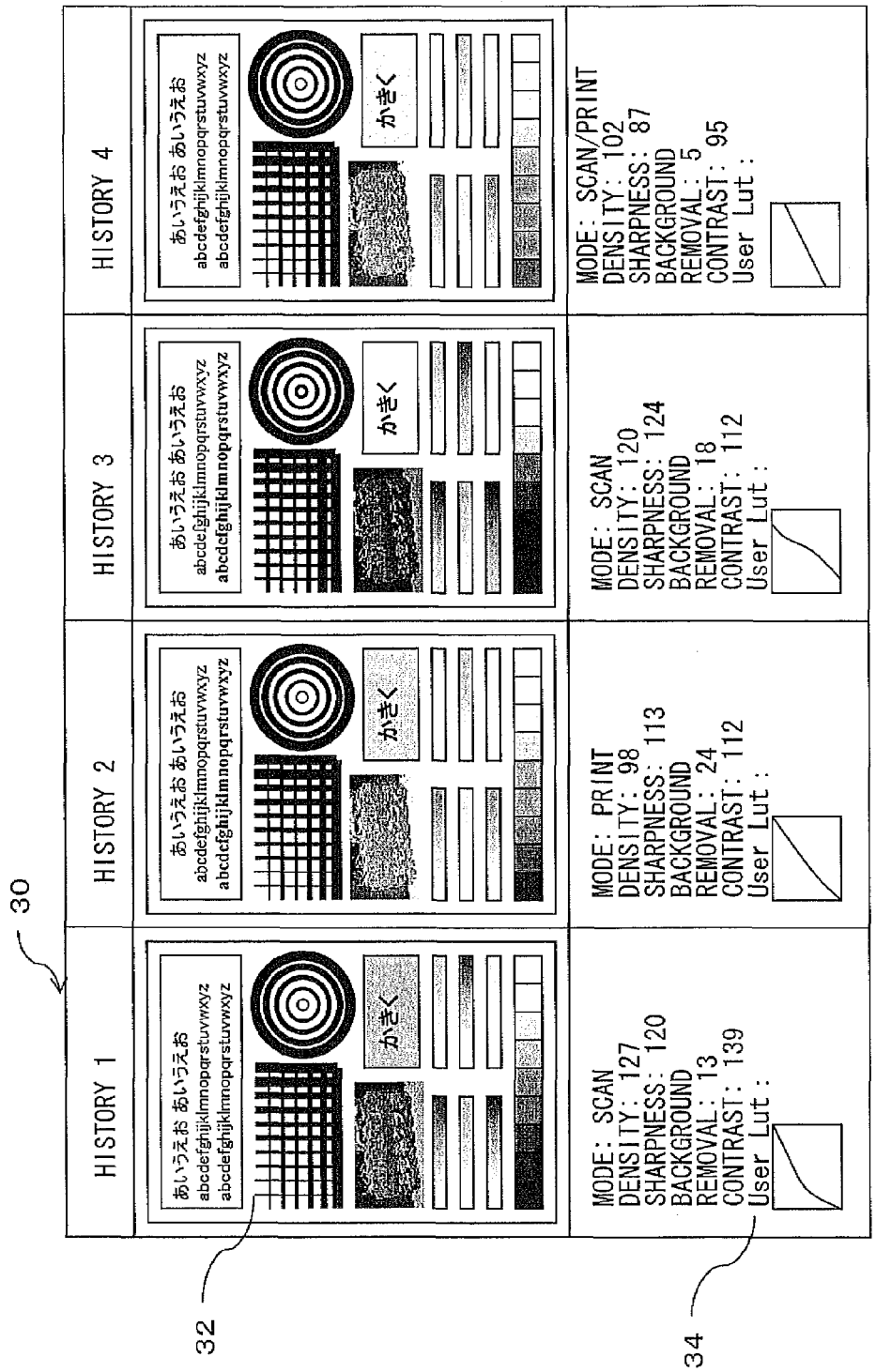
FIG. 3 illustrates processing condition history information stored in a processing condition history storage.

As shown in FIG. 3, the processing condition history storage 24 stores a combination of an image processing condition 34 that was used in the past and a processed reference image 32 that is obtained by image processing a reference image under this condition in a time sequence. This combination is referred to as processing condition history information 30. In the image processing condition 34, the value of "background removal" signifies the maximum optical density to be removed as the background and "User LUT" signifies a lookup table for the tone reproduction curve.

Figure 4:
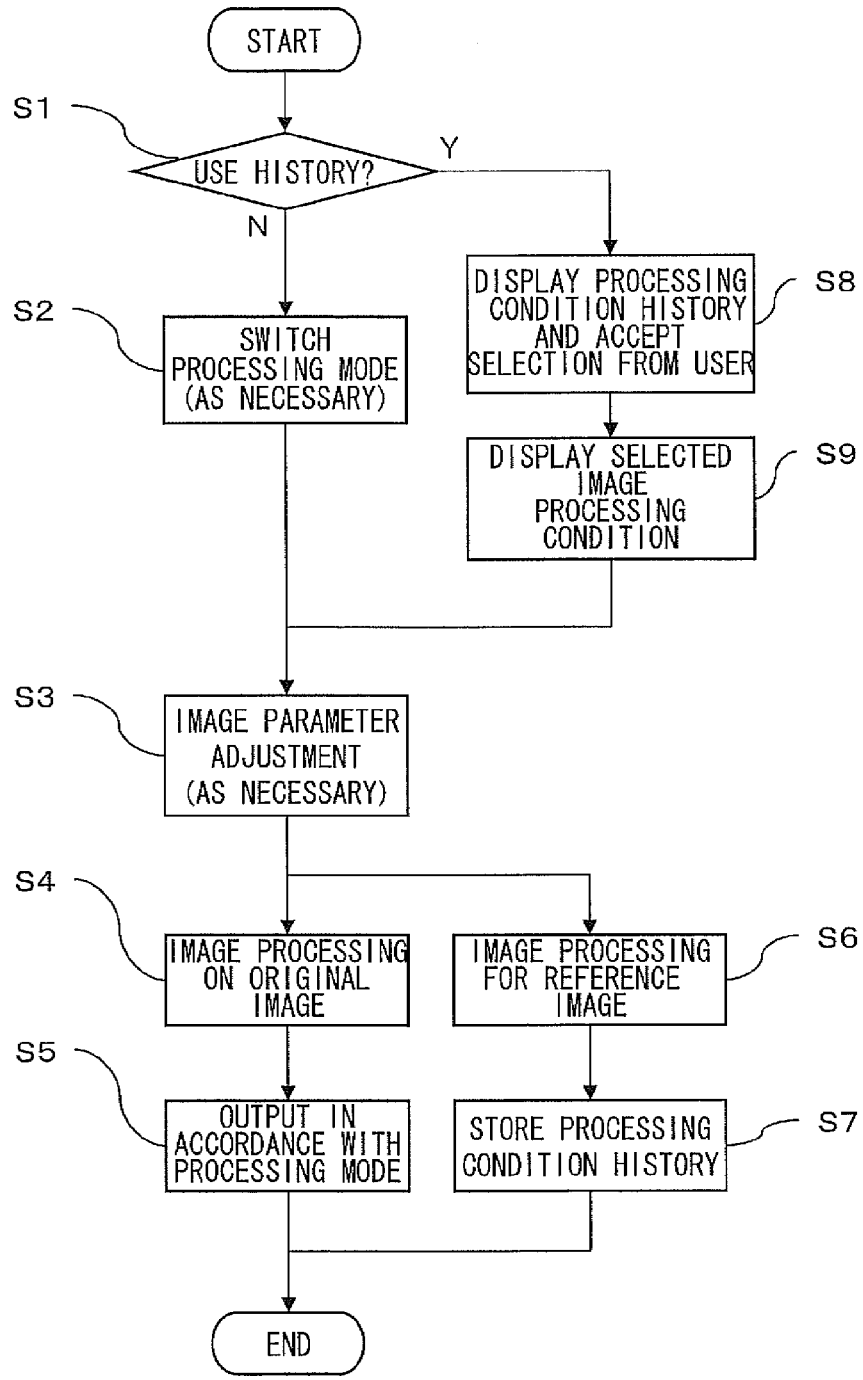
FIG. 4 is a flowchart showing a procedure for the image processing apparatus of the exemplary embodiment.

If reuse of the processing condition history is selected, a control program executed by the control section 18 reads the processing condition history information stored in the processing condition history storage 24 and presents it to the user. A sequence of job processes for the image processing apparatus including reuse of the processing condition will be described next with reference to FIG. 4.

From a menu screen presented by the UI section 16 of the image processing apparatus, a user can select menu items to use of the processing condition history (S1). If printing is to be performed on the image processing apparatus from a remote PC (personal computer), a user interface screen prompting whether to use the processing condition history may be displayed by the printer driver of the PC to accept a selection by the user.

If use of the processing condition history is not selected, the processing mode (copy, scan, facsimile transmission) can also be switched (S2) as necessary from the local UI section 16 of the image processing apparatus. Processing, such as printing or facsimile transmission, can be executed on the image processing apparatus from a host computer. In this case, the image processing apparatus judges the processing mode that was selected by the user from the processing mode information that is included in the job data, which is sent from the host computer. When the processing mode is determined, the user can make a menu selection from the menu screen of the UI section 16 to invoke screens for adjusting or selecting image quality parameters, such as density, contrast, type of original (text image or photographic image), and so forth, and modify the various image quality parameters from the default values as necessary (S3). Parameters not changed by the user remain at their default values. If a mode has been set to automatically detect the type of original, the controller 18 performs automatic detection of the type of original. The corresponding image quality parameters can then be automatically set according to the detected result. If the user does not make changes to the image quality parameters, the process for step 3 is not performed.

When the image processing condition, which is a set of individual conditions, such as image quality parameters and processing mode, is determined in the above-mentioned manner and the processing is initiated, such as by the press of a start button, the controller 18 causes the image processor 20 to perform image processing on the original under the image processing conditions (S4). The press of the start button triggers the start of the processing in the case of copying, scanning, or facsimile transmission. In this case, an original image that has been placed on a platen or into an automatic document feed mechanism (not shown) is scanned by the scan engine 12 and the image processing is performed on the resulting original image. In the case of printing, when a sequence for processing job data sent from a host computer arrives, image processing is performed on the image indicated by the job data according to the image processing condition (if it exists) that is determined at the image processing apparatus and the image processing condition that is indicated in the attribute information within the job data. Then, the image that was processed at the image processor 20 is output to a destination in accordance with the processing mode (S5). For example, in the case of the print mode or copy mode, the processed original image is sent to the print engine 10 and printed on paper. In the case of the scan mode, the processed original image is stored into a storage device within the image processing apparatus or transmitted via the communication processor 14 to a user-specified destination. In the case of the facsimile transmission mode, it is transmitted to the destination facsimile number via a facsimile transmission device (not shown).

Furthermore, the image processing apparatus of the embodiment performs the same image processing on the reference image (S6) as that performed on the original image in step S4 in accordance with the image processing condition determined in steps S2 and S3. Then, a combination of the processed reference image obtained from the image processing and the image processing condition is registered (S7) as new processing condition history in the processing condition history storage 24. As a result, the processing condition history at the time can be subsequently reused.

If registration to the processing condition history storage 24 is performed after performing image compression on the processed reference image, storage capacity of the image processing apparatus can be reduced. In this case, it is preferable to use a lossless compression method for the image compression. When compressing and storing the processed reference image in this manner, a suitable compression level is employed in the compression method that is used for the reference image. The compression level can be improved by placing similar types of image objects close together.

Furthermore, a thumbnail (reduced image) of the processed reference image may be created and stored as one item in the processing condition history. The thumbnail can be used when displaying the processed reference image on the display screen of the UI section 16 of the image processing apparatus. At the same time, the non-reduced processed reference image can be used when printing to paper or output as data. The user can ascertain the effect of the image processing condition from the displayed or output processed reference image. If a configuration is employed where the processed reference image is only displayed on the display screen of the UI section 16 and not printed out, only the thumbnail need be stored in the processing condition history and the processed reference image at the original high resolution need not be stored. The processing condition history may be registered with attribute information on the date and time the processing was executed, the user name of the user who invoked the processing, and so forth. To display the thumbnail of the processed reference image, the reference image should be created with prior consideration to prevent defects from developing that could hinder image quality detection, such as missing image information or moire patterns.

Furthermore, the current image processing condition determined in steps S2 and S3 and the image processing conditions in the processing condition history already registered in the processing condition history storage 24 are compared. If the same image processing condition is found in the processing condition history, the processing may be controlled to terminate step 6. In this case, the time sequence, date and time, user name, and so forth of the data in the processing condition history having the same condition as the current condition may be modified so as to be used as the current processing condition history. As a result, the time required for image processing in step S6 can be reduced. Furthermore, since the same image processing condition need not be stored a multiple number of times, the capacity of the processing condition history storage 24 can be reduced. Instead of comparing the current and the past image processing conditions, the processed reference image that was processed under the current condition and the processed reference images from the past image processing conditions can be compared. The processing may then be controlled so that a past image processing condition can be used in the current history if its similarity is greater than or equal to a predetermined value. Furthermore, if the processed reference image is only to be presented on the display screen of the UI section 16 and not to be printed out, the comparison of the current and the past images can be performed on thumbnails of the processed-reference images.

If the storage capacity of the processing condition history storage 24 becomes insufficient when storing new processing condition history into the processing condition history storage 24, the controller 18 may delete as necessary from the oldest processing condition history being stored in the processing condition history storage 24 in a manner similar to cache memory management. Deletion of old history may be performed periodically. Instead of deleting as necessary from the oldest history, all processing condition history items registered for a predetermined period of time before the current deletion process may be deleted at once. Furthermore, a deletion precedence may be assigned and mapped to each user or processing mode. Then, the deletion precedence corresponding to a processing mode or a user who invoked the processing corresponding to the processing condition history and the age and deletion precedence of the processing condition history are evaluated into a value so that deletion may be performed according to the order of the evaluation values. Furthermore, the deletion may be ordered from only the deletion precedence. Moreover, the processing may be controlled so that an administrator or ordinary user of the image processing apparatus can specify, such as on the UI section 16, which processing condition history is not to be deleted so that it is kept even if it becomes old.

The processes for steps S6 and S7 can be executed anytime after the image processing condition for the original image has been decided. For example, they may be executed before, after, or in parallel with the image processing for the original image. Preferably, they are executed when the image processing apparatus does not have to perform job processing (such as when a job execution command is not accepted within a certain period of time and the apparatus enters an idle state) after image processing for the original image has completed. To accomplish this, the image processing conditions suitable for the original are stored in a time sequence so that when the apparatus enters the idle state, the stored image processing conditions can be used to perform image processing on the reference image.

The menu screen of the UI section 16 can be designed to allow the user to select an option of whether or not to store the processing condition history. If a selection is made to not store the processing condition history, the processes of S6 and S7 are not performed.

Furthermore, if multiple reference images are prepared and separated into applications, the user can be allowed to select which reference image to use. This selection may be executed somewhere between step S2 and step S6. For example, if the user selects to store the processing condition history at the selection of whether or not to store the processing condition history, the reference image list is presented to the user so as to let the user select one or more reference images. If the reference images have been prepared according to processing mode, only the reference images corresponding to the processing mode selected in step S2 are presented to the user as options. If multiple reference images are selected, image processing is performed on the multiple reference images in step S6. The resulting multiple processed reference images are mapped to the corresponding image processing conditions used at the time and registered in the processing condition history storage 24.

The processing flow described hereinabove was for the case where it was decided in step S1 that the processing condition history would not be reused. If it is decided to reuse the processing condition history, the controller 18 presents the information on the processing condition history being stored in the processing condition history storage 24 to the user and provides a user interface to the user for selecting the history to be reused (S8). One example of a display screen 200 for this user interface is shown in FIG. 5.

Figure 5:
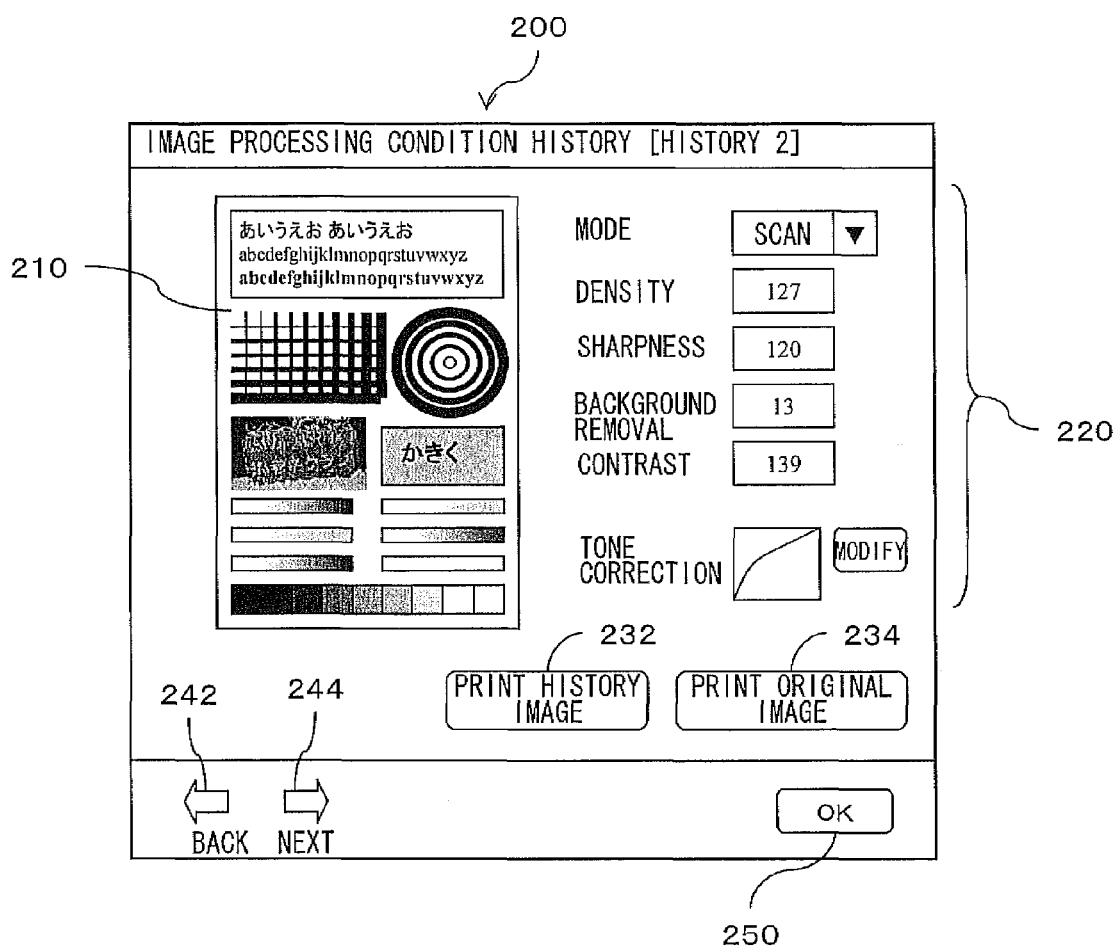
FIG. 5 shows one example of a user interface screen for the selection of processing condition history.

The display screen 200 illustrated in FIG. 5 shows information for one processing condition history. The displayed information for one processing condition history includes a thumbnail image 210 of the processed reference image and a list 220 of individual conditions forming the image processing condition that was applied to the image. The values of the individual conditions given in the list 220 can be modified (S3) by entry, such as on a keyboard, or selection from a pull-down list. For the tone reproduction curve, if the "modify" button is pressed, a user interface screen (which may be similar to a conventional screen) for setting and modifying the tone reproduction curve is invoked from which the tone reproduction curve can be modified. Furthermore, if the image quality of the processed reference image displayed on the display screen 200 is to be further studied, the user can also activate a button 232, such as with the touch of a finger, to print out the processed reference image of the corresponding processing condition history on the image processing apparatus. Moreover, to compare images, the user may press a button 234 so that the image processing apparatus prints out the original reference image that has not been image processed. Furthermore, although not shown, a thumbnail of the original reference image can be displayed on the display screen 200 together with or in place of the thumbnail image 210 of the processed reference image. Moreover, if raw data of the processed reference image is available, the display magnification of the thumbnail image 210 can be adjusted as needed so that the user can inspect the effect of the image processing in detail. Furthermore, if the processed reference image at the selected display magnification is larger than the display area for the thumbnail image 210, the interface can be designed to display only a part having the size of the display area and to allow scrolling of the displayed part.

If the user decides to use the image processing condition displayed on the display screen 200 on the basis of the printed out processed reference image or the thumbnail image 210, or if the user modifies an individual item on the list 210 of displayed image processing conditions to yield a desirable image processing condition, the press of an OK button 250 will confirm the selection of that image processing condition. The controller 18 stores the selected image processing condition and when the job is executed the image processing condition is applied. If the processing condition history displayed on the display screen 200 is not what the user desires, the user can press a "BACK" button 242 or a "NEXT" button 244 to display and consider the previous or next processing condition history on the display screen 200.

The user interface illustrated in FIG. 5 is nothing more than an example. A screen may be used that does not display the thumbnail image 210 of the processed reference image. In this case, the user judges the appropriateness of an image processing condition from the printed processed reference image. Furthermore, in a configuration where printing of the processed reference image is not to be performed, the buttons 232 and 234 for printing are unnecessary.

Furthermore, the processing condition history list registered in the processing condition history storage 24 may be displayed on the UI section 16. When the user selects a desired item, the display screen 200 may be displayed showing the information on the processing condition history.

After making a selection from the past processing condition history (S9) and making a desired modification to the selected condition (S3), image processing and output are performed for the original image in steps S4 and S5 in accordance with the selected condition (or modified condition if modified). In this case where the processing condition history is reused and the user did not modify the image processing condition of the reused history, the information on the processing condition history can be directly used so that the processes of steps S6 and S7 can be skipped and only the information on the date and time and time sequence of the reused processing condition history need be modified. On the other hand, if the user has modified an image processing condition of the selected processing condition history, steps S6 and S7 are executed.

In the above-mentioned procedure, the switching of the processing mode in step S2 (and image quality adjustment in S3) was performed after the user selected (S1) whether or not to use the processing condition history. However, the order of execution of steps S1 and S2 (and S3) may be reversed. If the selection of the processing mode (S2) is performed prior to the selection of whether or not to use the processing condition history, it is preferable to control the processing so as to provide only the processing condition history corresponding to the selected processing mode as an option in steps S8 and S9.

According to the image processing apparatus of the embodiment that was described hereinabove, the image processed result (processed reference image) for the reference image data having a known feature and prepared in advance is mapped to the image processing condition and stored. Therefore, when the user decides whether or not to reuse an image processing condition that was used in the past, the user can see the effect of the image processing condition from the image quality of the processing reference image without having to pay particular attention to the influence on the original image prior to processing.

The embodiment described hereinabove is nothing more than an example and various modifications are possible within the scope of the present invention.

For example, instead of providing the reference image storage 22, which stores the reference image data, within the image processing apparatus, it may be provided on a network (either wireless or wired) that is accessible from the image processing apparatus so that the image processing apparatus can acquire and use the reference images via the network as necessary. Similarly, the processing condition history storage 24 may be provided on a network so that the image processing apparatus can acquire the processing condition history from or register the processing condition history to the processing condition history storage 24 via the network as necessary.

Furthermore, the image processing for every individual condition forming the image processing condition can all be executed in step S6 for the reference image. Instead, however, the image processing corresponding to a condition at its default value need not be performed and only the image processing corresponding to the condition which was changed from its default value may be performed. In the case of software-based image processing, by skipping part of the image processing, the time and computational cost required for the image processing can be reduced.

Furthermore, a function to customize the reference image 100 may be included in the image processing apparatus. For example, if a user often decreases the density before printing, tone reproduction at a low density becomes important. In this case, it is preferable to allocate a relatively large number of steps in the low density region for the gray tone pattern object 114. A user interface screen may be provided for changing the tone pattern in the color tone pattern object 112 and the gray tone pattern object 114 so that a reference image including the tone pattern that was changed using this screen may be newly registered into the reference image storage 22. Moreover, the user may select from the objects 102 to 114 of various image types forming the reference image 100 as necessary to form and register a reference image from the selected objects.

Furthermore, it is preferable to create in advance a processed reference image corresponding to an image processing condition that is expected to be used often and to map the image to the image processing condition and store it for reuse. For example, since an image processing condition in which only the processing mode is specified with the default image quality parameters or an image processing condition in which only the image type (text, photographic, text and photographic) is specified with the default image quality parameters can be considered to used often, the results of processing reference images under these conditions may be created in advance and registered in the image processing apparatus. These often used image processing conditions and the corresponding processed reference images may be registered in an undeletable state in the processing condition history storage 24 and managed separately from "history".

Furthermore, with regard to a given image processing, such as density adjustment, a parameter (such as density value) for the processing need not be explicitly stored and can be obtained by computing backward from the processed reference image. Therefore, with regard to this type of image processing, there are instances where an individual condition, such as parameter value, need not be stored in the processing condition history.

Furthermore, it is preferable for the image processing apparatus to embed image processing condition information into the processed reference image. The image processing condition information may be embedded as user readable information (such as text information) into a non-obtrusive region within the image, such as a peripheral margin of the processed reference image. In this case, since the information is considered to remain readable by the user even after some image processing, the image processing condition may be embedded in part of the original reference image and a processed reference image may be obtained by performing image processing in accordance with the image processing condition on the original reference image.

Furthermore, an image processing condition may be embedded into the processed reference image as code information (such as barcode) for mechanical scanning.

Moreover, the printed result of the processed reference image that has been embedded with the image processing condition may be scanned by a scan engine 12 and the controller 18 (or a dedicated analytical engine) may analyze the code information that has been embedded within the scanned image to obtain the image processing condition so that the image processing can be performed by reusing the image processing condition.

Furthermore, the image processing apparatus may be provided with functions to output the data for the processed reference image or the original reference image to a network and to burn the data to a recording medium, such as CD-R. The user could study the effect of the image processing condition by displaying the data for the reference image, such as on a PC.

Moreover, although the combination of the image processing condition and the processed reference image of the applied result was stored and managed as "history" in a time sequence in the example hereinabove, this is not absolutely necessary.

Furthermore, an example was given hereinabove of applying the present invention to an image processing apparatus having the functions of printer, scanner, copier, and facsimile machine. However, the present invention is not limited to this and is also applicable to an image processing apparatus having fewer functions, such as a discrete printer, scanner, or copier.

Although a preferred form of the present invention has been described in its form with a certain degree of particularity using specific examples, it is to be understood that the invention is not limited thereto. It is further understood by those skilled in the art that various changes and modifications may be made in the invention without departing from the spirit and scope thereof.

What is claimed is:

1. An image processing apparatus comprising:
a processing condition setting section that sets an image processing condition to input image data;
an input image processing section that applies image processing to the input image data according to the image processing condition set to the input image data;
a reference image processing section that performs, in parallel to image processing of the input image data by said input image processing section, the image processing on reference image data according to the image processing condition set to the input image data and generates processed reference image data, said reference image data being unrelated to the input image data, said reference image data being image processed each time input image data is image processed by said input image processing section;
a processing condition registration section that registers, into a condition storage, the processed reference image data and the image processing condition set to the input image data, in correlation to each other;
a display that displays processed reference image data registered in the condition storage;
a selection section that selects processed reference image data from the displayed processed reference image data, wherein the image processing apparatus performs image processing on the input image data according to the image processing condition, and the image processing condition is related to the processed reference image data selected by the selection section; and
a reference image selection section that displays a plurality of reference image data, at least one of the reference image data being selected from the displayed reference image data by a user, wherein the reference image processing section performs image processing on the selected reference image data according to the image processing condition set by the processing condition setting section.

2. The image processing apparatus according to claim 1, further comprising:
a processing condition selection section that selects processed reference image data registered in the condition storage;
wherein the image processing apparatus performs image processing on the input image data according to the image processing condition, and the image processing condition is related to the processed reference image data selected by the processing condition selection section.

3. The image processing apparatus according to claim 1, further comprising:
a display that displays reference image data, the reference image data not being subjected to the image processing.

4. The image processing apparatus according to claim 1 further comprising:
a section that customizes the reference image data.

5. The image processing apparatus according to claim 1, wherein:
the image processing condition to be set by the processing condition setting section is a combination of a plurality of unit processing conditions.

6. The image processing apparatus according to claim 1, wherein:
if the image processing condition that was set by the processing condition setting section with respect to the input image data is identical to the image processing condition that has been stored in the condition storage, the image processing by the reference image processing section with respect to the reference image data is omitted.

7. The image processing apparatus according to claim 1, wherein:
the condition storage stores the image processing condition and the corresponding processed reference image data as a time sequence history for which an image processing condition has been set by the processing condition setting section.

8. The image processing apparatus according to claim 1, wherein the condition storage does not automatically delete a combination of the image processing condition and the corresponding processed reference image data registered in the condition storage when an undeletable state is set to the combination.

9. An image processing apparatus comprising:
a processing condition setting section that sets an image processing condition;
an image processing section that performs image processing on an original image according to the image processing condition; and
an output section that prints out an image that has been processed by the image processing section;
wherein the image processing section comprises:
a reference image processing section that generates, in parallel to image processing of the original image by said image processing section, processed reference image data by performing image processing on reference image data according to the image processing condition to be performed on the original image, said reference image data being unrelated to the input image data, said reference image data being image processed each time an original image is image processed by said image processing section;
a processing condition storage that stores the processed reference image data and the image processing condition, in correlation to each other;
a display that displays processed reference image data registered in the processing condition storage;
a selection section that selects processed reference image data from the displayed processed reference image data, wherein the image processing section performs image processing on the input image data according to the image processing condition, and the image processing condition is related to the processed reference image data selected by the selection section; and
a reference image selection section that displays a plurality of reference image data, at least one of the reference image data being selected from the displayed reference image data by a user, wherein the reference image processing section performs image processing on the selected reference image data according to the image processing condition set by the processing condition setting section.

10. An image processing method comprising:
performing image processing on input image data according to an image processing condition set to the input image data;
performing, in parallel to image processing of the input image data, the image processing on reference image data according to the image processing condition set to the input image data and generates processed reference image data, the reference image data being unrelated to the input image data, said reference image data being image processed each time input image data is image processed;
storing the processed reference image data and the image processing condition, in correlation to each other, in a storage;
displaying processed reference image data stored in the storage;
selecting processed reference image data from the displayed processed reference image data;
image processing the input image data according to the image processing condition, the image processing condition being related to the selected processed reference image data;
displaying a plurality of reference image data, at least one of the reference image data being selected from the displayed reference image data by a user; and
image processing the selected reference image data according to the image processing condition.

11. A non-transitory storage medium readable by a computer, the storage medium storing a program of instructions executable by the computer to perform a function for image processing, the function comprising:
performing image processing on input image data according to an image processing condition set to the input image data;
performing, in parallel to image processing of the input image data, the image processing on reference image data according to the image processing condition set to the input image data and generates processed reference image data, the reference image data being unrelated to the input image data, said reference image data being image processed each time input image data is image processed;
storing the processed reference image data and the image processing condition, in correlation to each other, in a storage;

displaying processed reference image data stored in the storage;

selecting processed reference image data from the displayed processed reference image data;

image processing the input image data according to the image processing condition, the image processing condition being related to the selected processed reference image data;

displaying a plurality of reference image data, at least one of the reference image data being selected from the displayed reference image data by a user; and image processing the selected reference image data according to the image processing condition.

* * * * *